United States Patent [19]

Johnson et al.

[11] 4,047,383

[45] Sept. 13, 1977

[54] TORQUE CONVERTER WITH VARIABLE STATOR

[75] Inventors: Lowell E. Johnson, East Peoria; Raymond P. Cobb, Washington; Frank W. Howard, III, Dunlap; Dwayne D. Dietz, East Peoria, all of Ill.

[73] Assignee: Caterpillar Tractor Co., Peoria, Ill.

[21] Appl. No.: 741,005

[22] Filed: Nov. 11, 1976

Related U.S. Application Data

[63] Continuation-in-part of Ser. No. 699,777, June 25, 1976, abandoned, which is a continuation of Ser. No. 595,911, July 14, 1975, abandoned.

[51] Int. Cl.² ............................................. F16D 33/04
[52] U.S. Cl. ........................................ 60/354; 60/361
[58] Field of Search ............... 60/332, 341, 342, 343, 60/352, 354, 356, 361, 362

[56] References Cited

U.S. PATENT DOCUMENTS

| | | | |
|---|---|---|---|
| 1,199,361 | 9/1916 | Fottinger | 60/334 |
| 2,162,543 | 6/1939 | Banner | 60/342 |
| 2,187,937 | 1/1940 | De Lavaud | 60/356 |
| 2,727,360 | 12/1955 | Kelley | 60/345 |
| 2,898,740 | 8/1959 | Kelley | 60/356 |
| 2,929,267 | 3/1960 | Wilson | 60/354 X |
| 2,932,939 | 4/1960 | Hause | 60/354 |
| 2,932,940 | 4/1960 | Edsall et al. | 60/355 |
| 3,237,481 | 3/1966 | Kelley | 60/345 X |
| 3,258,081 | 6/1966 | Kugel et al. | 180/53 |
| 3,330,112 | 7/1967 | Denes et al. | 60/354 |
| 3,354,643 | 11/1967 | Paredes | 60/354 |
| 3,354,746 | 11/1967 | Paredes | 74/688 |
| 3,358,444 | 12/1967 | Tuck | 60/354 |
| 3,370,425 | 2/1968 | Au | 60/356 |
| 3,466,869 | 9/1969 | Walker et al. | 60/342 |
| 3,559,404 | 2/1971 | Moan | 60/356 |

Primary Examiner—Edgar W. Geoghegan
Attorney, Agent, or Firm—Phillips, Moore, Weissenberger, Lempio & Majestic

[57] ABSTRACT

The invention relates to an improvement in a torque converter which includes a main stator, a pump and a turbine. The improvement comprises a novel auxiliary stator intermediate the main stator and the pump, said auxiliary stator including a plurality of holes therethrough adjacent the periphery thereof. Also part of the improvement are a plurality of vanes fixedly attached to a plurality of shafts which are rotatably mounted through said holes for adjustably directing flow of hydraulic fluid from the main stator through the vanes and to the pump. A plurality of handles, one attached at a fixed angle to an end of each of the shafts removed from the vane thereon, also forms a part of the improvement. A sleeve is provided which includes a plurality of slots at one end thereof the slots being in one to one relation with the number of handles, one handle being slidably held in each of said slots. Means are provided for operator adjustment of the position of the sleeve which leads directly to changing the angles of said vanes.

19 Claims, 14 Drawing Figures

FIG_1

FIG_2

FIG_3

FIG_4

FIG_5

TORQUE CONVERTER WITH VARIABLE STATOR

CROSS-REFERENCE TO RELATED APPLICATIONS

This application is a continuation-in-part of copending application Ser. No. 699,777 filed June 25, 1976, now abandoned, which is a continuation of copending application Ser No. 595,911, filed July 14, 1975, now abandoned.

BACKGROUND OF THE INVENTION

1. Field of the Invention

The invention relates to the field of torque converters and more particularly relates to the field of torque converters wherein means are provided for varying the flow angle of fluid delivered from the stator of the torque converter to the pump thereof.

2. Prior Art

Hydraulic torque converters comprising a stator, a pump and a turbine are, of course, well known. Briefly, and by way of summary, the pump of a torque converter impels hydraulic fluid to the turbine of the torque converter, the pump being generally driven via a mechanical linkage by the flywheel of a motor. The hydraulic fluid impelled by the pump impinges upon the blades of the turbine and causes the turbine to rotate, which rotary motion is translated to the drive shaft of the vehicle. As the hydraulic fluid leaves the turbine it passes through a stationary member a stator. The stator includes blades which direct the hydraulic fluid to the pump. Stators with variable angling of their blades are known to the prior art. Typical prior art hydraulic torque converters are disclosed, for example, in U.S. Pat. Nos. 1,199,361; 2,162,543; 2,187,937; 2,727,360; 2,898,,740; 2,932,939; 2,932,940; 3,237,481; 3,330,112; 3,354,746; 3,358,444; 3,370,425; 3,466,869; 3,559,404. Thus, it is known to change the blade angles of a stator so as to change the fluid momentum into the pump of a torque converter. It is also known, as shown, for example, in Kugel et al, U.S. Pat. No. 3,520,081, to use a main stator with fixed blades in combination with an auxiliary stator with blades whose angle relative to the direction of fluid flow can be changed.

The present invention in concerned with an improvement in a torque converter which includes a main stator, a pump and a turbine, the improvement comprising a particular auxiliary stator wherein control of the position or angle of the blades of the stator in controlled by an operator and wherein the change in torque output of the turbine can, if desired, be made generally linearly dependent upon the pressure exerted by the operator upon a foot pedal or the like controlling the vane position.

SUMMARY OF THE INVENTION

Briefly, the invention comprises an improvement in a torque converter, said torque converter including a main stator, a pump and a turbine hydraulically driven by a hydraulic fluid impelled by said pump. The improvement comprises an auxiliary stator intermediate to the main stator and pump, the auxiliary stator including a plurality of holes therethrough adjacent the periphery thereof with a plurality of vanes fixedly attached to a plurality of shafts which are rotatably mounted through said holes for adjustably directing flow of a hydraulic fluid from the main stator through the vanes and to the pump. A plurality of handles also forms a part of the improvement, one attached at a fixed angle to an end of each of the shafts removed from the vanes thereon. A sleeve including a plurality of slots at one end thereof the number of slots being in one to one relation with the number of handles, one handle being slidably held in each of said slots also comprises a part of the improvement of the invention. Further, part of the invention are means for operator adjustment of the position of the piston.

An object of the invention is to provide a design which allows complete vane closing during shifting with resultingly less energy dissipation in the transmission clutch and partial vane closing at times other than shifting to permit the vehicle engine to be operated at a selected generally constant efficient speed over the entire work cycle through controlling torque to the ground and thus ground speed whereby energy savings result.

Another object of the present invention is to provide a hydrodynamic torque converter that will provide infinitely variable torque output between a "maximum" position corresponding to full prime mover horsepower and a "closed" position corresponding to complete meridianal flow shut-off.

Still another object of the invention is to provide the ability to change from the maximum to the closed position sufficiently fast so that the torque can be changed from maximum to minimum and from minimum to maximum in less than one second.

A further object of the invention is to provide a design which can be economically manufactured as by investment casting without machining each blade and/or radially indexing to machine pivot bearing bores.

Yet another object of the invention is to make use of a standard pump, turbine and stator wheel, whereby if the variable feature is not needed, the variable blade assembly is merely replaced by a spacer.

Another object still of the invention is to provide a system wherein the turbine torque can be varied linearly with applied pedal pressure.

BRIEF DESCRIPTION OF THE DRAWINGS

The invention will be better understood by reference to the figures of the drawings wherein like numbers denote like parts throughout and wherein.

DESCRIPTION OF THE PREFERRED EMBODIMENTS

Figure 1:
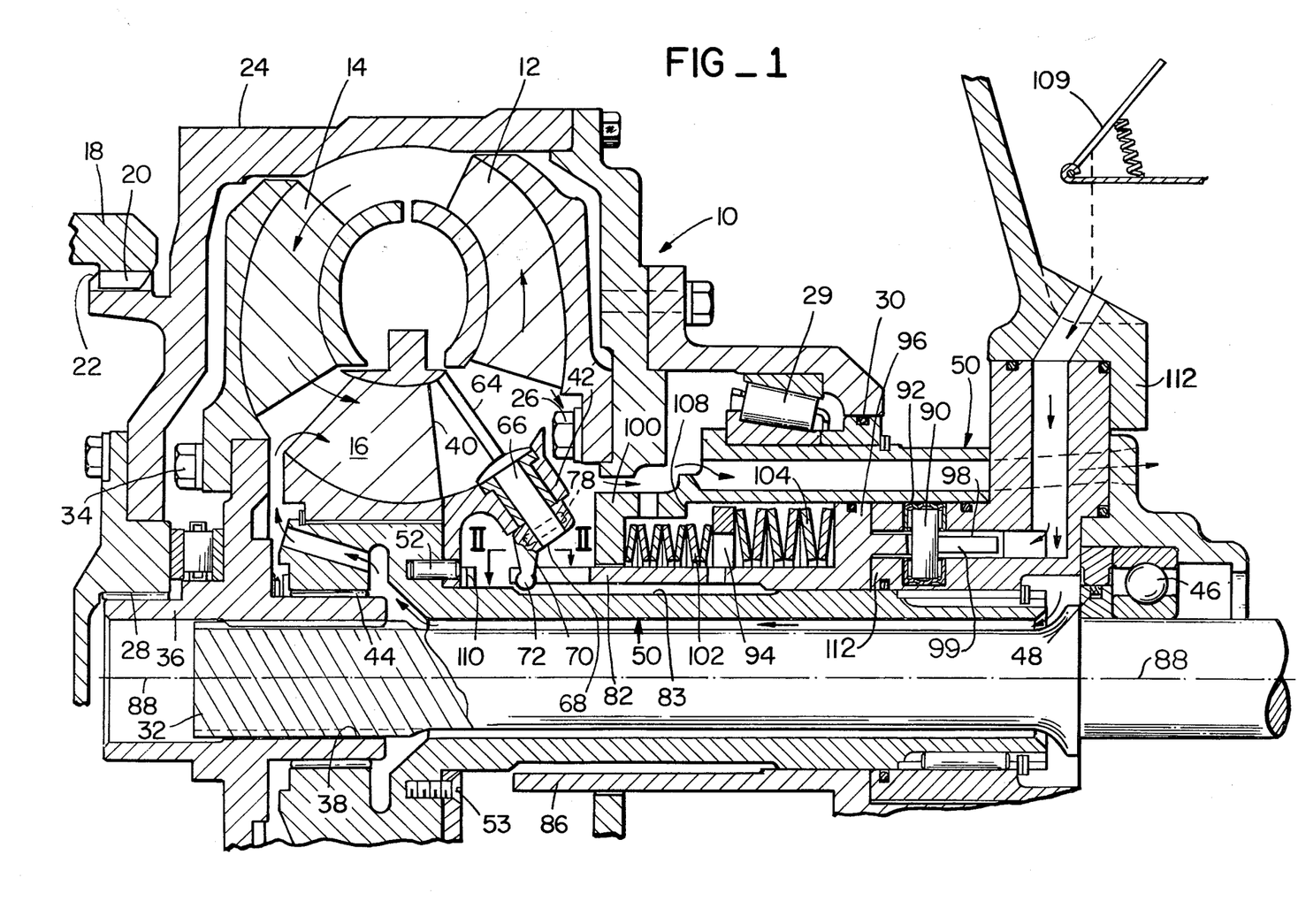
FIG. 1 illustrates in side sectional partial elevation a first embodiment of an improved torque converter in accordance with the present invention.
Figure 2:
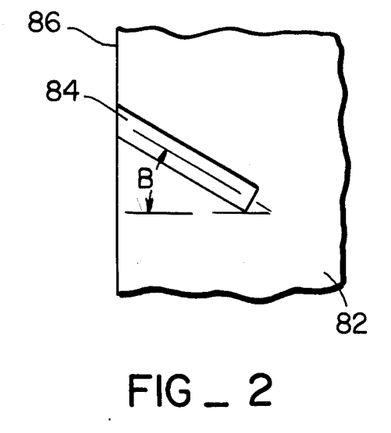
FIG. 2 is a partial view taken along the plane indicated by II—II of FIG. 1.

With reference most particularly to the FIGS. 1–8 of the drawings, FIG. 1 illustrates a torque converter 10 and more particularly a fluid torque converter which includes a pump 12, a turbine 14 and a stator 16. Rotary motion is imparted to the pump 12 by the flywheel 18 which is drivingly attached thereto by the teeth 20 thereof engaging the teeth 22 of the casing 24 which is rigidly attached to the pump 12 via a plurality of bolts 26, one of which is shown in FIG. 1. The arrows in FIG. 1 illustrate the direction of flow of hydraulic fluid through the torque converter 10 as impelled by the pump 12. Rotational mounting for the casing 24 is provided by the bearings 28 and 29. Hydraulic fluid is retained by the seal 30. The flywheel 18 is driven by, for example, a conventional internal combustion engine which is not illustrated. The pump 12, in the usual manner, includes a number of pump vanes so arranged as to impart fast flow to hydraulic fluid which enters it while it is rotating.

The turbine 14 is conventional and includes a plurality of vanes adapted to transfer the energy of the fluid impelled into the turbine into energy of rotation of the turbine and then to direct the fluid, now moving at a slower velocity, to the stator 16. The turbine 14 is attached to the drive shaft 32 via a plurality of bolts 34, one of which is shown in FIG. 1, and which attach the turbine 14 to a flanged collar 36 which is drivingly connected to the drive shaft 32 along the interior 38 of the flanged collar 36.

The stator 16 comprises a main stator 40 with fixed vanes for directing fluid flow from the turbine 14 therethrough in combination with an auxiliary stator 42. The bearings 44 and 46 allow the turbine 14 and the drive shaft 32 to rotate about and within the stationary support member 50. Seal ring 48 serves to retain hydraulic fluid.

The auxiliary stator 42 is fastened to the main stator 40 via the locator pins 52 and a plurality of bolts 53. The auxiliary stator 42 is shown more clearly in FIGS. 4 and 5. It includes a central opening 54, which as shown in FIG. 1, allows mounting about the drive shaft 32 through use of the bores 56 for bolts 53 and the holes 57 for the pins 52 through the plate portion 58 of the auxiliary stator 42. At the periphery of the plate portion 58 and set at an obtuse angle, A, to said plate portion 58 is a collar 60 having a plurality of holes 62 therethrough. The number of holes 62 on the collar 60 is precisely equal to the number of vanes 64 of the auxiliary stator 42. Vanes 64 direct fluid between pmup vanes of the pump 12.

Referring to FIGS. 1, 6A, 6B, 7A and 7B, there are illustrated one of a plurality of vanes 64 which are integral with a shaft 66, said shaft 66 passing in rotating relation through one of the holes 62 and extending therebeyond at an end 68 of said shaft 66. Each of said shafts 66 includes a flange 69 adjacent the vane 64 thereof to position said vane 64 relative to said holes 62. Also illustrated is a handle 70 which includes a lever portion 72 and a collar portion 74 having a bore 76 therethrough, said bore 76 being adapted to fit over the shaft 66 adjacent the end 68 thereof and being held in place by a pin 78 which passes through a cross bore 80 and a vane shaft bore 81. The lever portion 72 leaves the collar portion 74 at the circumference thereof to provide an effective lever arm length in a plane generally parallel to said cross bore 80 and at the obtuse angle, A, from a plane perpendicular to the axis of said bore 76 so as to depend generally toward the drive shaft 32. The direction of rotation of the vane 64 relative to the auxiliary stator 42 is then determined by the rotation of the handle 70 relative to the auxiliary stator 42. An undercut 83 in the stationary support member 50 provides room for a slight advance of the lever portion 72 towards the drive shaft 32 as said lever portion 72 slides within one of a plurality of slots 84. The auxiliary stator 42, the vanes 64 and the handles 70 can each be inexpensively made as by investment casting or like techniques.

Control of the rotation of the handle 70 is provided by the sleeve 82 and more particularly by the plurality of slots 84, one for each of the handles 70, said slots 84 being equally spaced peripherally about the one end 86 of the sleeve 82. As will be most apparent from FIG. 2, the slots 84 are at an angle, B, to the axis 88 of the sleeve 82 (and of the drive shaft 32). Since the sleeve 82 is prevented from rotating about its axis by a plurality of rollers 90 in a plurality of bearings 92, motion of the sleeve 82 towards the stator 16 necessarily leads to rotation of the lever portion 72 of the handle 70 and thereby leads to rotation of thereto attached shaft 66 and the integral vanes 64 of the auxiliary stator 42. The lever portion 72 of the handle 70 is generally so arranged that the vanes 64 are closed when the sleeve 82 is at its rightward-most position. Because of the direct action of the sleeve 82 upon the handle 70, the vanes 64 are very quickly shiftable from a "maximum" position corresponding to full output horsepower to a "closed" position corresponding to meridianal flow shut-off. Generally, such shifting is accomplishable in less than one second.

The sleeve 82 has a washer 94 thereabout intermediate the ends thereof. The sleeve 82 ends in a piston 96, said piston 96 having a sleeve 98 extending from the side of said piston 96 opposite the sleeve 82 side thereof. Sleeve 98 contains a plurality of slots 99 wherein lie rollers 90 which linearly guide sleeves 82 and 98 and piston 96 parallel to the axis 88 of the drive shaft 32. Between the washer 94 and a stationary lip 100, a first plurality of conical compression washer type springs 102 are positioned. Between the washer 94 and the piston 96 a second plurality of conical compression washer type springs 104 are located. The combination of compression springs 102 and 104 and washer 94 bias the piston 96 against the stationary support 112. Extending from the stationary support member 50 is a stop 108 against which the washer 94 abuts as the piston 96 and sleeves 82 and 98 are motivated leftwardly towards the stator 16. Thus, once the washer 94 has traveled up to and against the stop 108, the piston 96 must be pushed against the full strength of the second and generally stronger plurality of compression springs 104 rather than against the lesser resultant strength of the first plurality of compression springs 102 and the second plurality of compression springs 104. If the first plurality of compression springs 102 is weaker than the second plurality of compression springs 104, as in the preferred embodiment of the invention, it becomes necessary to supply added force to motivate the sleeves 82 and 98 and the piston 96 towards the stator 16 when the washer 94 abuts the stop 108. This results in a unique control in the responsiveness of the direction of the vanes 64 to the amount of force being exerted to push the sleeves 82 and 98 and piston 96 towards the stator 16. In practice, the strength of the first plurality of compression springs 102 and the second plurality of compression springs 104 are adjusted so as to provide as linear as possible a change in output torque with the force applied to propel the sleeves 82 and 98 and the piston towards the stator 16. Also in practice, the piston 96 and the associated parts therewith are controlled by pressure on a foot pedal 109 of a vehicle which controls hydraulic pressure against the piston 96, and the vehicle operator gets a relatively uniform change in torque as he relatively uniformly pushes upon the foot pedal 109 thereby controlling the position of the piston 96. The leftwardly movement of the sleeves 82 and 98 and the piston 96 ultimately abuts the sleeve 82 against piston stop 110 and controls the maximum opening of the vanes 64 and, hence, the maximum torque capacity of the torque converter 10. When the control pressure on piston 96 is minimum, as when the foot pedal 109 is not being depressed or during a transmission shift, the vanes 64 are closed.

The vanes 64 are of sufficient size and may be rotated sufficiently through action of sleeve 82 upon the handle 70 so as to completely shut off flow from the stator 40 to the pump 12. This is especially useful since it allows complete closing of the vanes of the auxiliary stator during shifting whereby less energy is dissipated in the transmission clutch. The capability of partially closing the vanes 64 at times other than during a shift is also advantageous in that this permits the vehicle engine to be operated at a selected efficient speed over the entire work cycle through controlling torque to the ground and thus ground speed by opening and closing the vanes 64. With the engine at a selected efficient speed an energy saving results since the engine is not accelerated or decelerated continuously during an entire work cycle.

Figure 8:
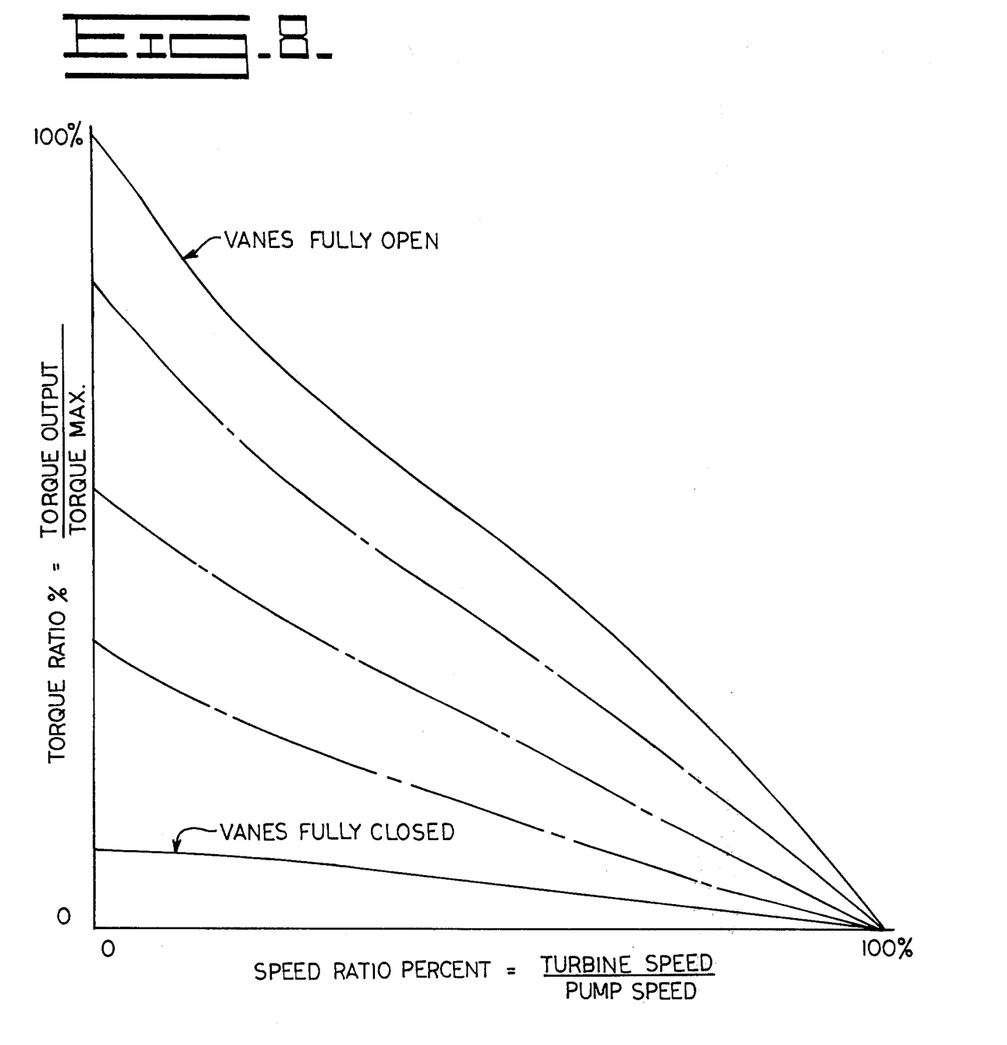
FIG. 8 illustrates speed ratio vs. torque ratio, in percent, graphically over the entire range of vane positions.

FIG. 8 illustrates torque ratios, in percent, available at different speed ratios, in percent, as the vanes 64 vary from fully open to fully closed responsive to applied pressure on the foot pedal 109.

Figure 3:
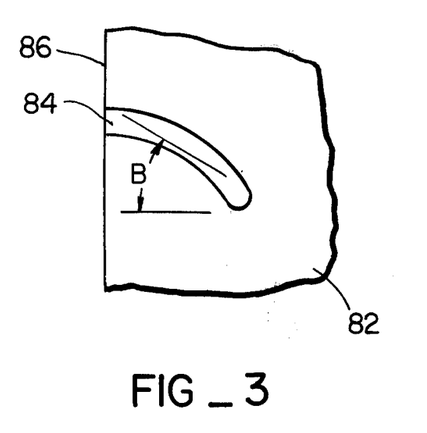
FIG. 3 illustrates an alternate embodiment of the structure shown in FIG. 2.
Figure 4:
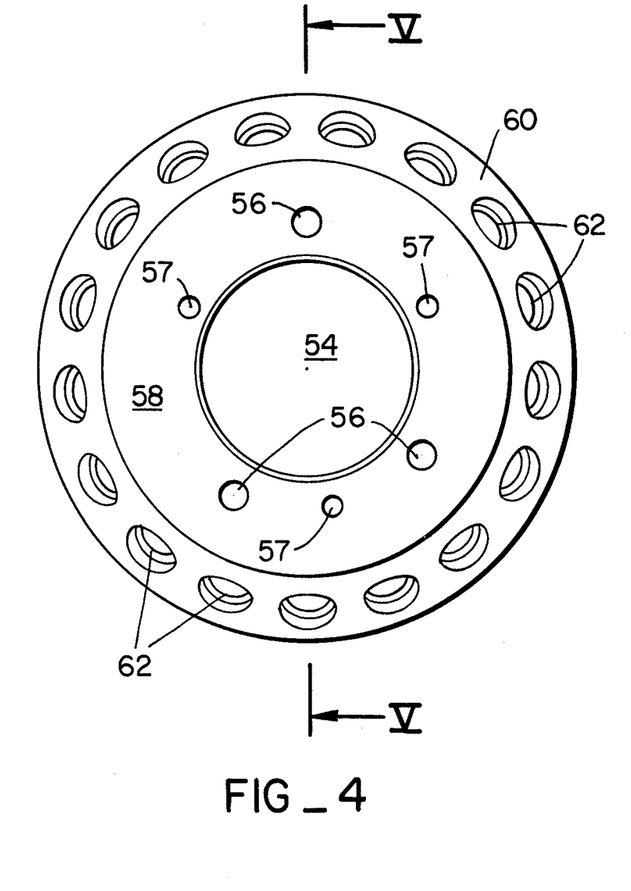
FIG. 4 comprises an end view of an auxiliary stator which forms a part of the present invention.
Figure 5:
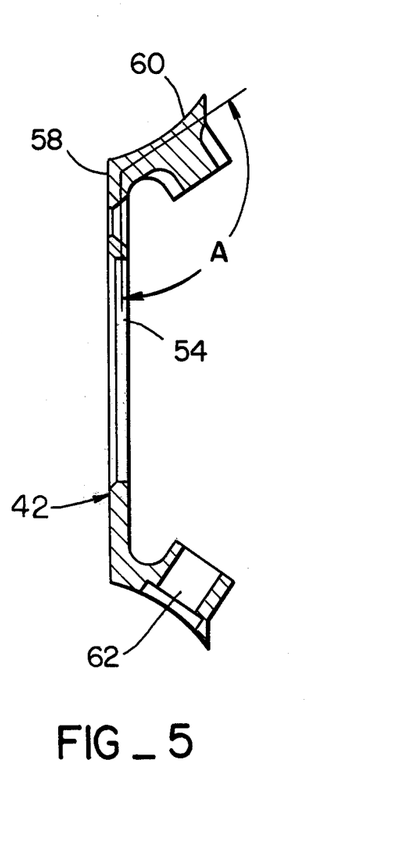
FIG. 5 is a view taken along the plane V—V of FIG. 4.

In the alternate embodiment of the invention illustrated in FIG. 3, the slot 84 is somewhat curved or arcuate rather than linear, although it still generally forms approximately an angle, B, with the axis 88 of the sleeve 82. The use of a curved slot 84, as shown in the embodiment of FIG. 3, can advantageously be used to make the change in torque delivered by the turbine 14 be even more linearly dependent upon the position of the foot pedal 109 which controls the position of the piston 96.

ALTERNATE EMBODIMENT OF FIGURES 9 ET SEQ

Figure 9:
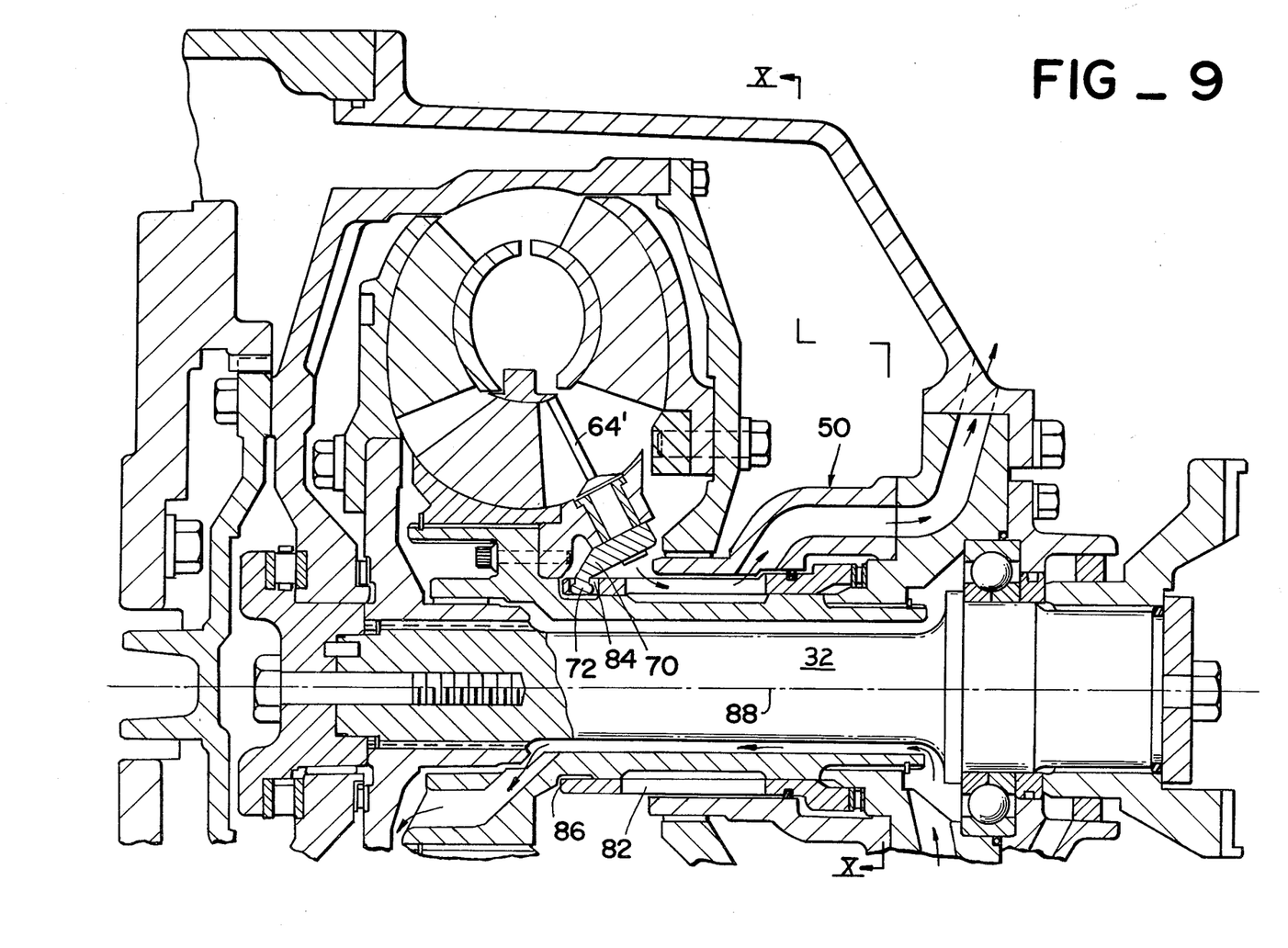
FIG. 9 illustrates an alternate embodiment of the present invention in a view similar to FIG. 1.
Figure 10:
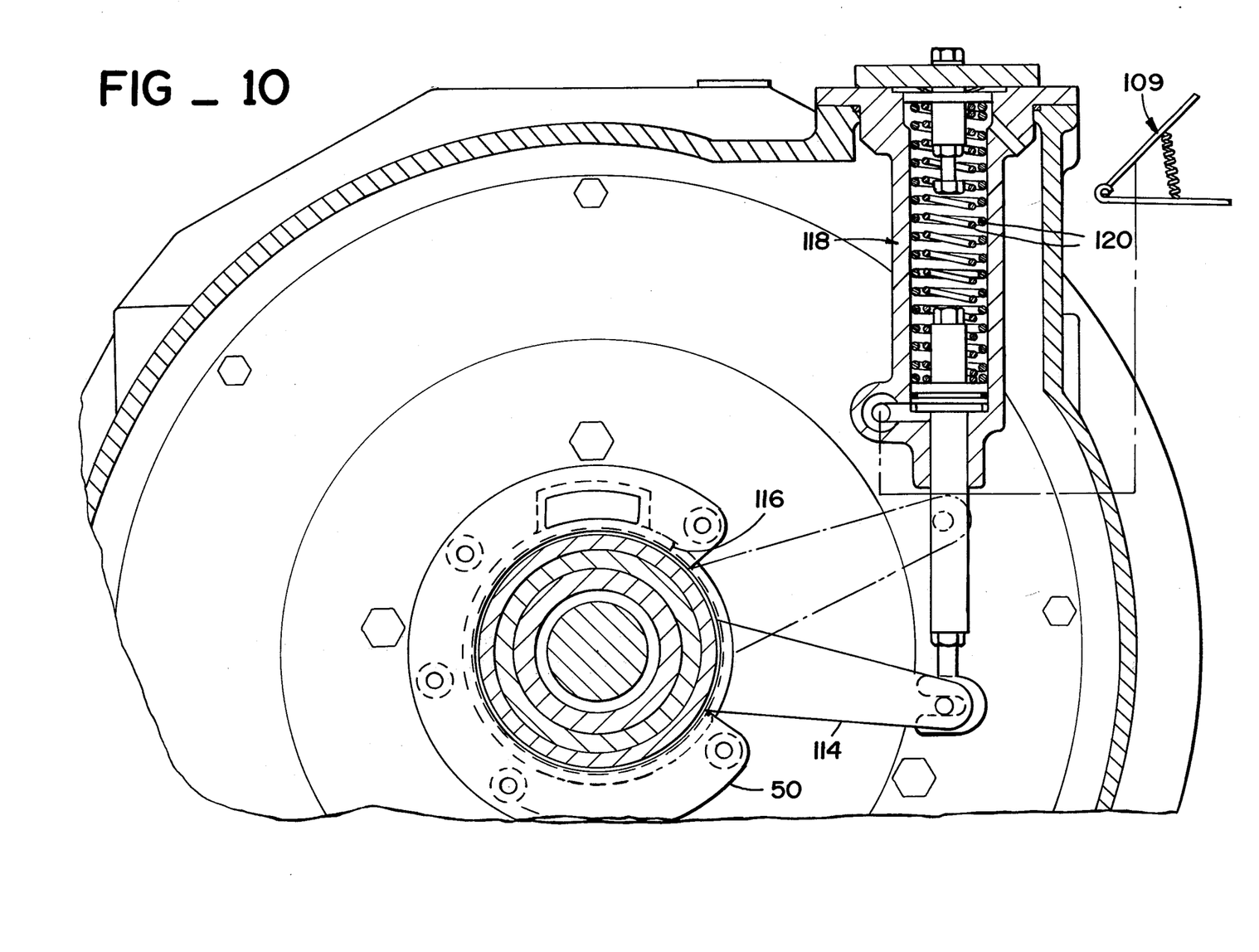
FIG. 10 illustrates a view taken along the line X—X of FIG. 9.

Adverting now to FIG. 9, there is illustrated therein an alternate embodiment of the present invention wherein the sleeve 82 instead of being movable linearly is movable rotatively under the impetus of a lever 114 which passes through an opening 116 in the stationary support member 50. The lever 114, as will be seen most clearly from FIG. 10, is impelled by a hydraulically activated cylinder 118. Flow to and from the head and piston ends of the cylinder 118 is controlled by the foot pedal 109. The hydraulic cylinder 118 generally has spring means 120 therein which generally bias the cylinder 118 to propel the lever 114 into a position whereby a plurality of vanes 64' are closed, thus preventing flow through the torque converter 10. As pressure is applied under the command of the foot pedal 109 to the rod end of the hydraulic cylinder 118 and away from the head end thereof, the lever 114 is moved upwardly against the biasing of the spring means 120 whereby the vanes 64' are controllably opened. The slots 84 of the sleeve 82 in the Embodiments illustrated in FIGS. 9 and 10, are equally spaced peripherally about the one end 86 of the sleeve 82. As will be apparent from FIG. 9, the slots 84 in the embodiments of FIGS. 9 and 10, are at a zero angle to the axis 88 of the sleeve 82 (and of the drive shaft 32). As the sleeve 82 is rotated about its axis under the impetus of the movement of the lever 114, the lever portion 72 of the handle 70 is moved in or out of the plane of FIG. 9 under the impetus of contact with the slot 84, which slot 84 is, of course, parallel to the axis 88. Because of the direct action of the sleeve 82 upon the handle 70, the vanes 64', as in the embodiment described previously, are very quickly shiftable from a "maximum" position corresponding to full output horsepower to a "closed" position corresponding to merdianal flow shut-off. Generally, such shifting is accomplishable in less than one second.

Figure 6A:
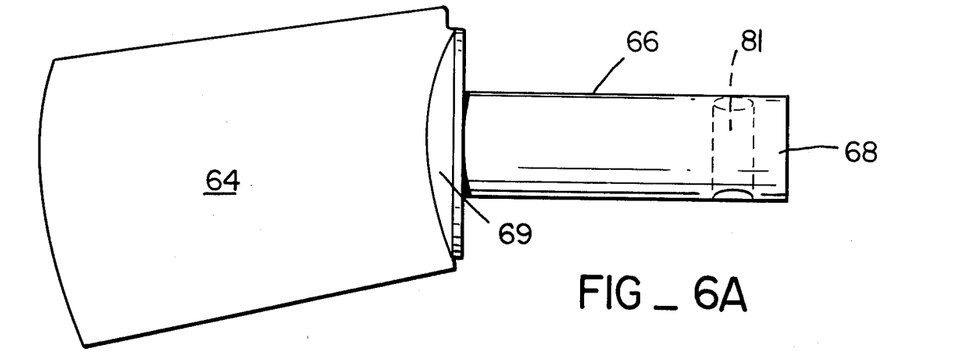
FIGS. 6A and 6B illustrate a vane as is useful in the improvement of the present invention.
Figures 6B, 7B:
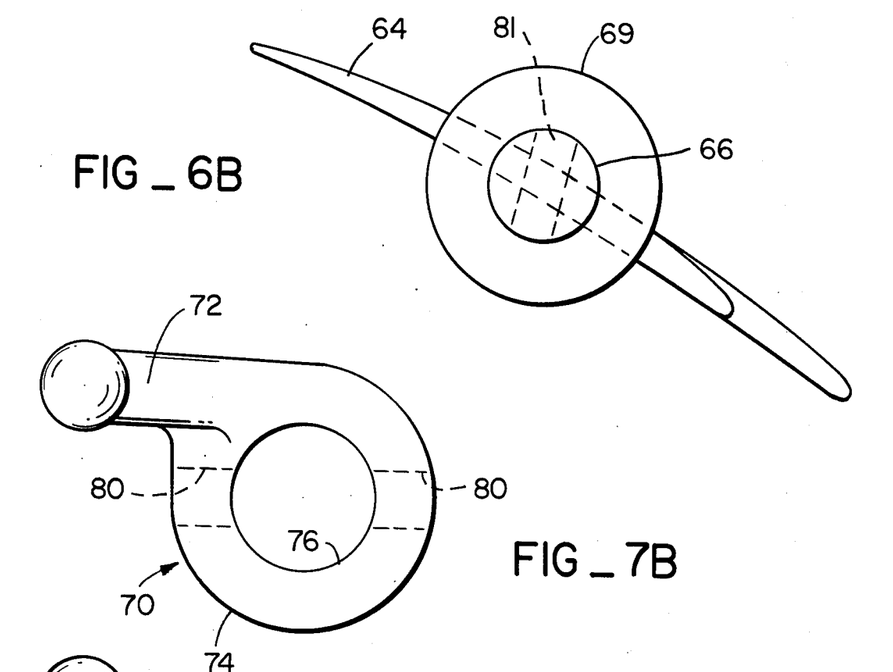
FIGS. 7A and 7B illustrate a handle as attachable to the vane of FIGS. 6A and 6B.
Figure 7A:
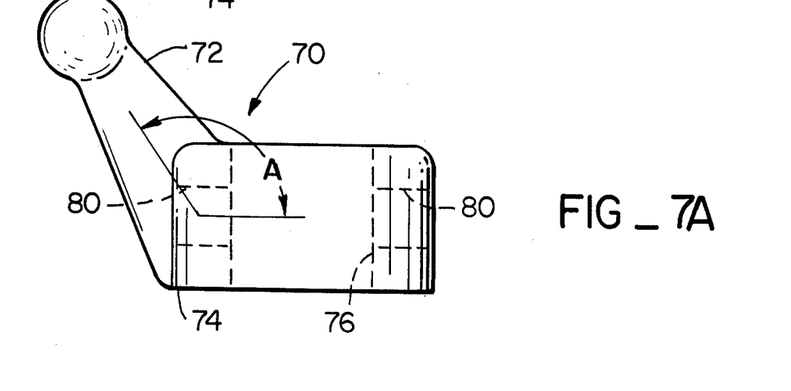
Figures 11, 12:
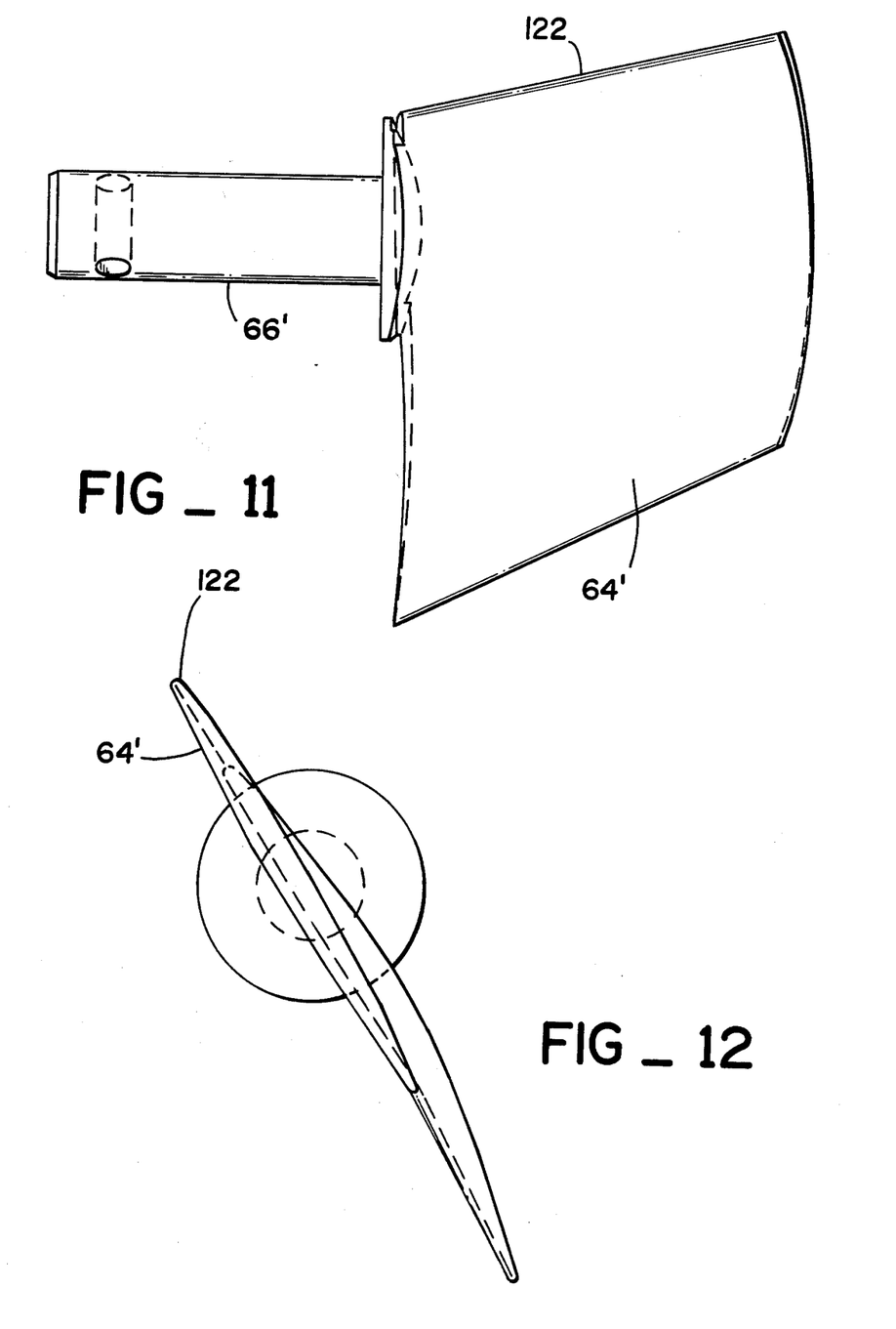
FIGS. 11 and 12 illustrate a vane as is particularly useful in the embodiment of FIGS. 9 and 10.

Turning to FIGS. 11 and 12, there is illustrated therein the vane 64' wherein the geometry thereof has been changed from that of the vanes 64 in FIGS. 6A and 6B so as to provide for more linear dependence of the torque output of the turbine 14 upon the pressure exerted by the operator upon the foot pedal 109. The vanes 64' differ from the vanes 64 by having a shaft 66' thereof adjacent a leading edge 122 thereof. This helps to assure that a linear relationship exists between control pressure as exerted by the pedal 109 and vane position (degree of opening).

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. An improvement in a fluid torque converter which includes a main stator communicating with a stationary member, a pump drivingly connected to an engine and a turbine output coupled to a drive shaft, the improvement comprising:
   an auxiliary stator intermediate the main stator and the pump, said auxiliary stator including a plurality of holes therethrough adjacent the periphery thereof;
   a plurality of vanes fixedly attached to a plurality of shafts rotatably mounted through said holes, said vanes being positioned to adjustably direct a flow of hydraulic fluid from the main stator past the vanes to the pump;
   a plurality of handles, one attached at a fixed angle to an end of each of said shafts removed from the vanes thereon;
   a sleeve including a plurality of slots at one end thereof, the number of slots being in one to one relation with the number of said handles, one handle being slidably held in each of said slots; and
   means for operator adjustment of the position of said sleeve in a direction which causes rotation of said handles.

2. An improvement in a fluid torque converter which includes a main stator communicating with a stationary member, a pump drivingly connected to an engine and a turbine output coupled to a drive shaft, the improvement comprising:
- an auxiliary stator intermediate the main stator and the pump, said auxiliary stator including a plurality of holes therethrough adjacent the periphery thereof;
- a plurality of vanes fixedly attached to a plurality of shafts rotatably mounted through said holes, said vanes being positioned to adjustably direct a flow of hydraulic fluid from the main stator past the vanes to the pump;
- a plurality of handles, one attached at a fixed angle to an end of each of said shafts removed from the vanes thereon;
- a sleeve including a plurality of slots at one end thereof, the number of slots being in one to one relation with the number of said handles, one handle being slidably held in each of said slots, said slots being at a skew angle relative to the axis of said sleeve; and
- means for preventing rotation of said piston relative to said stator; and
- means for operator adjustment of the linear position of said sleeve.

3. An improvement in a torque converter as in claim 2, wherein said auxiliary stator includes a plate portion with a collar attached peripherally at an obtuse angle A, thereto and wherein said holes are through said collar and are generally equally spaced about the periphery thereof.

4. An improvement in a torque converter as in claim 3, including means for biasing said sleeve away from said stator.

5. An improvement in a torque cnverter as in claim 4, wherein said sleeve biasing means comprises a first spring means biased between a stationary lip of a static frame and one side of a washer which surrounds said one end of said sleeve and a second spring means biased between the other side of said washer and a flange upraised from said one end and wherein said static frame further includes a stop adapted to engage said washer when said one end has traveled toward said stator a selected distance.

6. An improvement in a torque converter as in claim 5, wherein each of said plurality of slots is arcuate.

7. An improvement in a torque converter as in claim 5, wherein said handles proceed from said ends of said shafts removed from the vanes thereof generally towards said drive shaft.

8. An improvement in a torque converter as in claim 7, wherein said stationary member includes an undercut axially of said sleeve into which said handles can move as they are slid within said slots.

9. An improvement in a torque converter as in claim 8, wherein said handles each comprise a collar portion having an axis and a lever portion, said collar portions each being attached about an end of each of said shafts removed from the respective vane, said lever portion proceeding circumferentially from said collar portion at the obtuse angle, A, from a plane generally perpendicular to the axis of the bore of said collar portion.

10. An improvement in a torque converter as in claim 9, wherein said adjustment means comprises a pedal which controls hydraulic pressure against said sleeve whereby shifting of said vanes from a completely open position to a completely closed position is quickly accomplishable and turbine output torque varies substantially linearly with applied pedal pressure.

11. An improvement in a torque converter as in claim 10, wherein said engine is operated at a selected substantially constant efficient speed and ground speed is controlled through controlling output torque whereby energy savings result.

12. An improvement in a fluid torque converter, which includes a main stator communicating with a stationary member, a pump drivingly connected to an engine and a turbine output coupled to a drive shaft, the improvement comprising:
- an auxiliary stator intermediate the main stator and the pump, the auxiliary stator including a plurality of holes therethrough adjacent the periphery thereof;
- a plurality of vanes fixedly attached to a plurality of shafts rotatably mounted through said holes, said vanes being positioned to adjustably direct a flow of hydraulic fluid from the main stator past the vanes to the pump;
- a plurality of handles, one attached at a fixed angle to an end of each of said shafts removed from the vanes thereon;
- a sleeve including a plurality of slots parallel to the axis thereof at one end thereof, the number of slots being in one to one relation with the number of said handles, one handle being slidably held in each of said slots; and
- means for operator adjustment of the rotational position of said sleeve about its axis.

13. An improvement in a torque converter as in claim 12, wherein said auxiliary stator includes a plate portion with a collar attached peripherally at an obtuse angle, A, thereto, and wherein said holes are through said collar and are generally equally spaced about the periphery thereof.

14. An improvement in a torque converter as in claim 13, wherein said handles proceed from said ends of said shafts removed from the vanes thereof, generally towards said drive shaft.

15. An improvement as in claim 14, wherein said means for operator adjustment of the rotational position of said sleeve comprises a lever proceeding radially outwardly from said sleeve and means for adjusting the position of said lever.

16. An improvement in a torque converter as in claim 15, wherein said lever adjustment means comprises a pedal which controls hydraulic pressure to a hydraulic cylinder which acts against said lever at a position removed from said sleeve whereby shifting of said vanes from a completely open position to a completely closed position is quickly accomplishable.

17. An improvement in a torque converter as in claim 10, wherein said shafts of said vanes are connected to said vanes adjacent a leading edge thereof whereby turbine output torque varies substantially linearly with applied pedal pressure.

18. An improvement in a torque converter as in claim 17, wherein said handles each comprise a collar portion having an axis and a lever portion, said collar portion each being attached about an end of each of said shafts removed from the respective vane, said lever portion proceeding circumferentially from said collar portion at the obtuse angle, A, from a plane generally perpendicular to the axis of the bore of said collar portion.

19. An improvement in a torque converter as in claim 18, wherein said engine is operated at a substantially constant efficient speed and ground speed is controlled through controlling output torque whereby energy savings result.

* * * * *